United States Patent
Utschig-Samuels et al.

(10) Patent No.: US 10,982,129 B2
(45) Date of Patent: Apr. 20, 2021

(54) COMPOSITION AND METHOD FOR MAKING CONVERTER-DISSOLVER COMPOSITION FOR DISSOLVING METAL SULFATE SCALES FROM SURFACES

(71) Applicant: NuGeneration Technologies, LLC, Emeryville, CA (US)

(72) Inventors: Stephen Utschig-Samuels, Emeryville, CA (US); Donato Polignone, Emeryville, CA (US)

(73) Assignee: NuGeneration Technologies, LLC, Emeryville, CA (US)

( * ) Notice: Subject to any disclaimer, the term of this patent is extended or adjusted under 35 U.S.C. 154(b) by 400 days.

(21) Appl. No.: 15/230,110

(22) Filed: Aug. 5, 2016

(65) Prior Publication Data

US 2018/0037805 A1 Feb. 8, 2018

(51) Int. Cl.
*C09K 8/528* (2006.01)
*C11D 3/36* (2006.01)
(Continued)

(52) U.S. Cl.
CPC .............. *C09K 8/528* (2013.01); *C11D 1/143* (2013.01); *C11D 3/044* (2013.01); *C11D 3/10* (2013.01); *C11D 3/30* (2013.01); *C11D 3/33* (2013.01); *C11D 3/361* (2013.01); *C11D 11/0041* (2013.01)

(58) Field of Classification Search
CPC ..... C09K 8/528; C11D 11/0041; C11D 1/143; C11D 3/044; C11D 3/10; C11D 3/30; C11D 3/33; C11D 3/361
See application file for complete search history.

(56) References Cited

U.S. PATENT DOCUMENTS

| 2,396,938 A | 3/1946 | Bersworth |
| 2,787,326 A | 4/1957 | Hughes |

(Continued)

FOREIGN PATENT DOCUMENTS

CN 102703233 B 9/2013

OTHER PUBLICATIONS

Stepan Product Bulletin, Bio-Terge PAS-8S, 2 pages (Year: 2019).*
(Continued)

*Primary Examiner* — Alicia Bland
(74) *Attorney, Agent, or Firm* — Robert D. Atkins; Patent Law Group: Atkins and Associates, P.C.

(57) ABSTRACT

A converter-dissolver composition in an aqueous solution of carbonate or bicarbonate, chelating agents, hydroxide base, and surfactant wetting agent. A mixture of the chelating agents and carbonate or bicarbonate is diluted with deionized water. The mixture reacts for five minutes. The hydroxide base is added to the mixture to form an in-situ reaction with the carbonate or bicarbonate and reacted for another five minutes. The solution pH is adjusted with the chelating agent. The surfactant wetting agent is added. The aqueous solution is heated to 70-230° C. and applied to a surface of oil or gas well and pipeline equipment with metal sulfate scales in a ratio of 3.78 liters of the aqueous solution per 0.45 kilograms of the metal sulfate scales. The aqueous solution reacts for 0.25-1.5 hours to dissolve the metal sulfate scales. The aqueous solution and dissolved metal sulfate scales are flushed from the surface.

15 Claims, 2 Drawing Sheets

(51) Int. Cl.
*C11D 1/14* (2006.01)
*C11D 3/04* (2006.01)
*C11D 3/10* (2006.01)
*C11D 3/30* (2006.01)
*C11D 3/33* (2006.01)
*C11D 11/00* (2006.01)

(56) References Cited

U.S. PATENT DOCUMENTS

| | | | |
|---|---|---|---|
| 2,845,337 | A | 7/1958 | Myers |
| 3,547,194 | A | 12/1970 | Morine |
| 3,793,209 | A | 2/1974 | Thompson |
| 4,108,246 | A | 8/1978 | Jones |
| 4,144,185 | A | 3/1979 | Block |
| 5,146,988 | A | 9/1992 | Paul |
| 5,183,112 | A | 2/1993 | Paul et al. |
| 5,762,821 | A | 6/1998 | Tate |
| 5,821,211 | A | 10/1998 | Borah |
| 6,331,513 | B1 | 12/2001 | Zaid et al. |
| 6,494,218 | B1* | 12/2002 | Zaid .............. C02F 1/683 134/22.16 |
| 2007/0221246 | A1 | 9/2007 | Keatch |
| 2008/0035340 | A1* | 2/2008 | Welton .............. C09K 8/68 166/279 |
| 2008/0039345 | A1* | 2/2008 | Kippie .............. C09K 8/68 507/119 |
| 2009/0151944 | A1* | 6/2009 | Fuller .............. C09K 8/536 166/280.2 |
| 2015/0203739 | A1 | 7/2015 | Talley et al. |
| 2016/0130500 | A1* | 5/2016 | Chen .............. C11D 3/30 216/13 |
| 2016/0257870 | A1* | 9/2016 | Talley ............ C11D 3/3942 |

OTHER PUBLICATIONS

Gopi Shanmukha Parasa et al., "Synergistic Effect of EDTA and HEDP on the Crystal Growth Polymorphism, and Morphology of CaCo3", Ind. Eng. Chem. Res. 2015, 54, pp. 3618-3625.

* cited by examiner

COMPOSITION AND METHOD FOR MAKING CONVERTER-DISSOLVER COMPOSITION FOR DISSOLVING METAL SULFATE SCALES FROM SURFACES

FIELD OF THE INVENTION

The present invention relates to a composition and method for making a converter-dissolver composition for dissolving metal sulfate scales from various surfaces found in oil or gas well and pipeline equipment.

BACKGROUND OF THE INVENTION

One generally accepted principle of metal sulfate scale formation is that of chemical precipitation resulting from the contact of two fluid streams. Waters containing high concentrations of alkaline earth metal cations, such as barium, calcium, strontium, and magnesium can mix with waters containing high concentrations of anions, such as sulfate, carbonate, bicarbonate, phosphate, and fluoride. Salts form upon contact with these two fluid streams and the solubility constants of these respective salts may be exceeded, leading to precipitation of the salts. The solubility constants of the salts can be influenced in a number of ways, e.g., by lowering overall solubility in water and exacerbating the problem through precipitation. Some of the influencing factors include temperature, pressure, pH, and presence of seeding crystals from already existing scale deposits.

Another cause of scale formation is attributed to the precipitation of scale material from supersaturated salt solutions containing the same. When solutions pass from strata, where pressures are relatively high, into the low pressure areas that exist at the wellbore, for example, precipitation of the metal salt on the tubing and surrounding strata occurs.

Scale formation can cause a severe decline in productivity as well as difficult operating conditions. If scale formation on surface, subsurface equipment, tubings, and perforations inhibits production to a sufficient degree, a workover job is typically needed to increase well production. Workovers may include bailing out of the accumulated scale and other solids, acidizing, fracturing, use of scale solvents, and the like. Removal of metal sulfate scale is highly problematic, especially when the scale is in a massive, dense, impermeable form, or deposited in pores or other openings within the formation. Metal sulfate scales are also often coated and/or interspersed with common organic deposits, such as paraffins and asphaltenes, making use of conventional scale solvents ineffective.

A strong alkali solution has been used to treat metal sulfate scales. Under certain favorable conditions of temperature and sufficient time, concentrated alkali solutions will, in some cases, provide a break-up of the scale after long treatment periods. Solutions of sodium and potassium hydroxide have been tried to remove metal sulfate scale. If, for example, a calcium sulfate scale is treated with concentrated potassium hydroxide for a relatively long time period, say from 24-72 hours, a white, fluffy precipitate of calcium hydroxide is formed. The new deposit or precipitate is then bailed from the well with mechanical equipment. Mechanical bailing is time consuming, expensive, and, in some cases, logistically impractical.

U.S. Pat. No. 2,787,326 teaches a two-step chemical treatment in lieu of mechanical bailing. A quantity of aqueous inorganic alkaline metal carbonate or bicarbonate salt is introduced into the wellbore containing a calcium sulfate scale deposit and then given sufficient contact time to react. For example, the reaction products of the alkaline metal carbonate, say sodium carbonate, and the calcium sulfate form a water soluble sodium sulfate salt, and minimally water-soluble calcium carbonate salt through a double decomposition reaction. However, calcium carbonate scale is still highly insoluble in water, and presents a whole different scale removal problem that requires the use of conventional and potentially toxic acidizing treatments that utilize hydrochloric acid, sulfuric acid, nitric acid, etc., that corrode equipment and present unsafe working conditions. Furthermore, the two-step treatment provides conversion of only the top layer of calcium sulfate scale to a more removable calcium carbonate scale. For full conversion and removal of the calcium sulfate scale, several treatments of the two-step procedure are needed, which involve more corrosion on equipment.

U.S. Pat. No. 4,108,246 increases the conversion efficiency of metal sulfate scale to several different forms, including calcium carbonate, calcium gluconate, and calcium hydroxide in the case of calcium sulfate scale conversion. However, the dissolution of salts still requires acidizing treatments, which corrode equipment and present unsafe working conditions.

U.S. Pat. No. 2,396,938 teaches a direct chelation method, such as using tetrasodium ethylenediaminetetraacetate (EDTA, NaEDTA), for removing metal sulfate scales. However, the direct chelation method in oil or gas well applications is limited by cost and relatively low effectiveness despite the extensive required chemical contact time. In another example, U.S. Pat. No. 3,547,194 uses hydroxyacetic acid (glycolic acid) and other low-cost chemicals in hydrocarbon producing wells. Again, the treatment requires long contact time and achieves low effectiveness.

U.S. Pat. No. 5,146,988 teaches a process of dissolving calcium sulfate scale by sparging carbon dioxide into well water at a downhole location to form an acidic solution containing an equilibrium mixture of carbonic acid, bicarbonate, and carbonate ions that convert calcium sulfate scale to calcium carbonate scale and allow for subsequent in-situ dissolution of the calcium carbonate scale into the acidic solution. U.S. Pat. No. 5,183,122 adds anions of monocarboxylic acid, oxalates, or thiosulfates into the well followed by sparging with carbon dioxide in order to prevent dissolved calcium carbonate from precipitating. However, sparging carbon dioxide is difficult to implement, and requires extensive equipment to perform the treatment.

U.S. Pat. No. 4,144,185 implements a descaling treatment with a converter, single chelating agent, and surfactant wetting agent. U.S. Pat. Nos. 6,331,513 and 6,494,218 teach a converter and multiple chelating agents. The one-step converter-dissolver solution encounters issues when dealing with scales that are coated and/or interspersed with common organic deposits, such as paraffins and asphaltenes. In addition, using a fluorosurfactant as a surfactant wetting agent, while effective due to a low critical micelle concentration, tends to foam heavily. The evolution of $CO_2$ gas during the overall reaction could create excessive foaming, rendering some or all of the solution ineffective due to temperature loss and dilution. U.S. Pat. No. 3,793,209 combines cleaner-dissolver emulsion to allow for the dissolver to penetrate the organic deposits. However, the exclusion of a converter component, as well as the aqueous chelating salt-being inhibited by the aromatic solvent, limited the overall effectiveness. Furthermore, in all prior art, the conversion step of metal sulfate to metal carbonate allows for the predominant polymorph of metal (calcium) carbonate, calcite, to form prior to dissolution through chelation. Being the most stable, insoluble, and lowest surface area polymorph, conversion to calcite limits the effective speed of dissolution.

Other prior art attempts to dissolve metal sulfate scales, such as boiling sulfuric acid, fracturing with high pressure, or scale perforation, are impractical or exhibit safety concerns. The known methods require specialized equipment and extended operation downtimes, while removing only a portion of the metal sulfate scales. If metal sulfate scale becomes too extensive, and irremovable by prior art methods, a well may be simply abandoned and a new well drilled, which is an impractical and costly outcome.

DETAILED DESCRIPTION

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1:
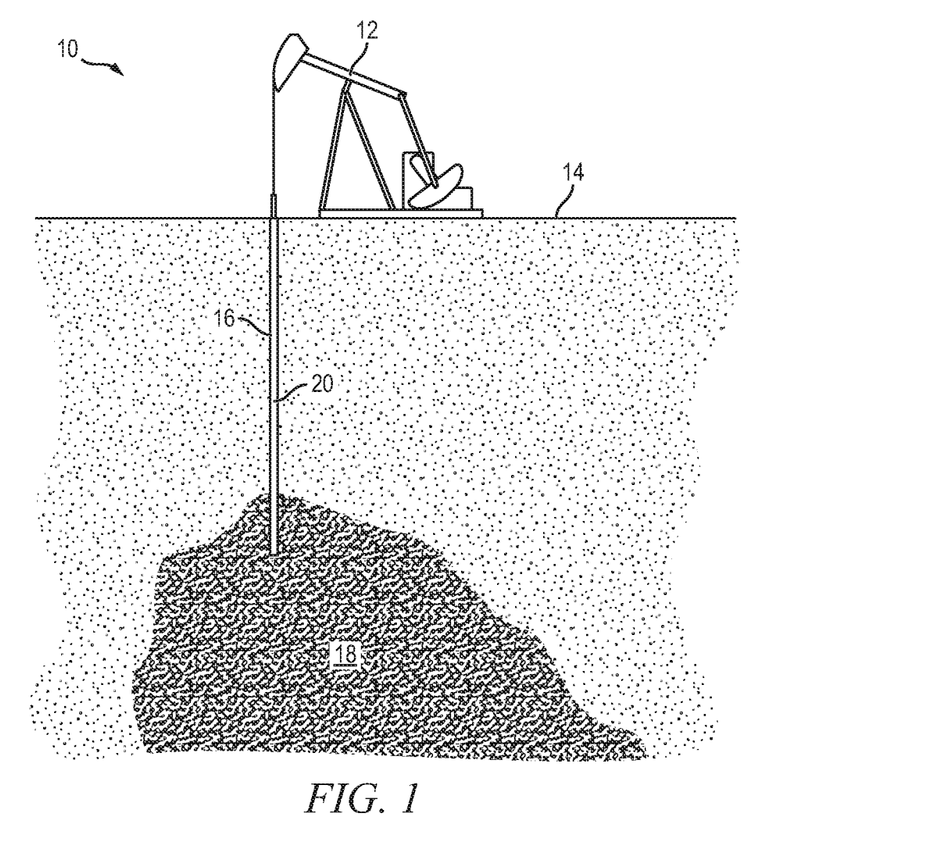
FIG. 1 illustrates an oil or gas well with piping extending from the pumping platform subterranean to the oil or gas source.
Figure 2:
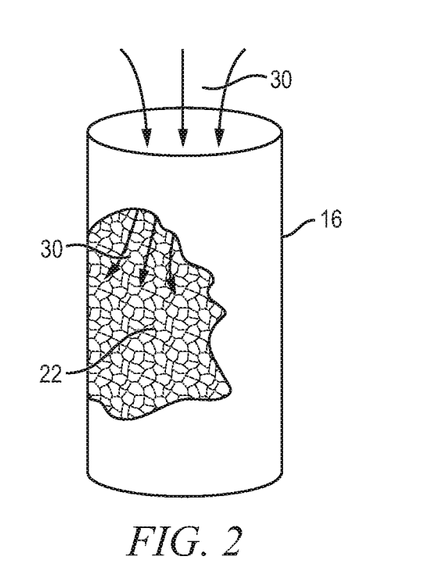
FIG. 2 illustrates an interior surface of the piping and application of a converter-dissolver composition to remove the metal sulfate scale deposits.

FIG. 1 illustrates oil or gas well 10 with pumping platform 12 positioned on ground 14. Piping 16 extends from pumping platform 12 subterranean to oil or gas reservoir or source 18. Oil or gas 20 flows up through piping 16 to pumping platform 12 for extraction. FIG. 2 illustrates an interior view of a portion of piping 16. Over time, metal sulfate scales 22 form on interior surface 24 of piping 16. Metal sulfate scales 22 can form in other oil or gas well and pipeline equipment, such as injection or disposal wells, heater treaters, boilers, coil-tubing, flow lines, tubing, formation surfaces, in water flooding, and the like.

A converter-dissolver composition 30 in an aqueous solution is applied to metal sulfate scales 22 formed on interior surface 24 of piping 16. Converter-dissolver composition 30 is pumped or injected into piping 16 as an aqueous solution and freely covers interior surface 24 of piping 16 and metal sulfate scales 22 formed on the interior surface by nature of a surfactant wetting agent. Converter-dissolver composition 30 dissolves metal sulfate scales 22 during a reaction time period. Converter-dissolver composition 30 may be circulated within piping 16 to enhance the reaction. After the reaction time period, residual converter-dissolver composition 30 and dissolved metal sulfate scales 22 are flushed away, leaving interior surface 24 of piping 16 clean and substantially free of the metal sulfate scaling.

Converter-dissolver composition 30 is particularly effective at dissolving metal sulfate scales 22, such as barium sulfate, calcium sulfate, strontium sulfate, and magnesium sulfate. Converter-dissolver composition 30 removes metal sulfate scales 22 from oil or gas producing wells, injection or disposal wells, heater treaters, boilers, coil-tubing, flow lines, piping, tubing, formation surfaces, in water flooding, and the like. The combined metal sulfate scale converter-dissolver composition 30 comprises an aqueous solution of organic or inorganic carbonate or bicarbonate, synergistic mixture of chelating agents, such as organophosphorus compounds and polyaminocarboxylic acids, organic or inorganic hydroxide base, and heat-stable, high cloud point, low foam surfactant wetting agent.

The carbonates or bicarbonates include all alkali metal carbonates and bicarbonates, and all inorganic carbonates and bicarbonates, as well as all organic carbonates or bicarbonates with phase transfer functionality, allowing the carbonate or bicarbonate converter chemistry greater penetrating power into scales that have been coated and/or interspersed with common organic deposits, such as paraffins and asphaltenes. In one embodiment, sodium bicarbonate provides a stable and soluble reaction product of the in-situ reaction between the bicarbonate and hydroxide base. Alternatively, ammonium bicarbonate, potassium bicarbonate, choline bicarbonate, ammonium carbonate, sodium carbonate, potassium carbonate, choline carbonate, tetramethylammonium bicarbonate, tetraethylammonium bicarbonate, tetrabutylammonium bicarbonate, tetramethylammonium carbonate, tetraethylammonium carbonate, and tetrabutylammonium carbonate can provide similar effects. The organic or inorganic carbonate or bicarbonate should be present in the composition at a level of 1-10% by weight, or 3-8% by weight.

Polyaminocarboxylic acid is a salt of EDTA, or derivatives thereof, and can function as a first chelating agent. In another embodiment, the first chelating agent can be tetrasodium ethylenediaminetetraacetate (EDTA, NaEDTA). Other salts of EDTA, and similar derivatives, that achieve similar effects include diammonium ethylenediaminetetraacetate ((NH4)2EDTA), tetraammonium ethylenediaminetetraacetate ((NH4)4EDTA), tetrasodium ethylenediaminetetraacetate tetrahydrate (NaEDTA*4H2O), disodium ethylenediaminetetraacetate dehydrate (Na2H2EDTA*2H2O), ethylene diaminetetraacetic acid (H4EDTA), disodium ethylenediaminetetraacetate dehydrate (Na2H2EDTA*2H2O), calcium disodium ethylenediaminetetraacetate dehydrate (CaNa2H2EDTA*2H2O), trisodium N-(hydroxyethyl)-ethylenediaminetriacetate (HEDTA), pentasodium diethylenetriaminepentaacetate (Na5DPTA, DPTA), pentapotassium diethylenetriaminepentaacetate (K5DPTA, DPTA), diethylenetriaminepentaacetic acid (H5DPTA, DPTA), nitriloacetic acid, trisodium salt (NTA), N,N-diacetic acid, tetrasodium (GLDA Na4), glutamic acid, N,N-diacetic acid, monosodium (GLDA Na), ethanoldiglycinic acid (EDG Na2, HEIDA), and glucoheptanoic acid. The polyaminocarboxylic acid should be present in the composition at a level of 10-50% by weight, or 10-30% by weight.

The organophosphorus compound is an organophosphonic acid, or derivatives thereof, and can function as a second chelating agent. In one embodiment, the organophosphorus compound can be 1-hydroxyl ethylidene-1,1,-diphosphonic acid (HEDP). Other similar organophosphonic acids that achieve similar effects include amino tri (methylene phosphonic acid) (AMTP), diethylenetriamine penta(methylene phosphonic acid), bis(hexamethylene triamine penta(methylenephosphonic acid)), ethylidenediamine tris(methylene phosphonic acid), pentapotassium salt Na5EDTMP, hexamethylenediamine tetra(methylene phosphonic acid), potassium salt, and hydroxyacetic acid (glycolic acid). The organophosphonic acid should be present in the composition at a level of 1-10% by weight, or 3-8% by weight.

The chelating agents are selected to influence the crystalline polymorph of the metal carbonate scale that has been formed due to the conversion mechanism of the bicarbonate salt. Generally, carbonate scale, particularly calcium carbonate scale exists in three crystalline polymorphic forms, in the order of increasing stability: vaterite, aragonite, and calcite. Because different polymorphic forms of the same substance have different properties, polymorphism plays an important role in controlling the carbonate scale formation in the conversion from sulfate scale using chelating agents or other chemicals used in internal treatment. For example, the predominant polymorphic form of calcium carbonate in scale is calcite, and vaterite is seldom present. When precipitation of calcium carbonate occurs in the presence of tetrasodium ethylenediaminetetraacetate (EDTA, NaEDTA) alone, calcite still predominates at 60, 130, 200 and 230° C., respectively. At 100° C., aragonite predominates. However, in a mixture of 1-hydroxyl ethylidene-1,1,-diphosphonic acid (HEDP) and tetrasodium ethylenediaminetetraacetate (EDTA, NaEDTA), vaterite predominates exclusively at 30, 100, 130, 200 and 230° C., with aragonite being the second most predominant, meta-stable polymorph present. Vaterite and aragonite, being the least stable, most soluble and highest surface area polymorphs of calcium carbonate, are much more readily attacked in the complex system.

When the polyaminocarboxylic acid begins to sequester free calcium cations, a hydronium ion is released during the formation of the calcium polyaminocarboxylate chelate. The free hydronium ion reacts with the bicarbonate, forming $CO_2$ gas which then lowers the pH around the carbonate scale, as converted from the sulfate scale, allowing for the carbonate scale to be more readily dissolved and subsequently chelated by the mixed synergistic chelating agents. Formation of $CO_2$ gas releases in the reaction and causes the scale deposits to break apart to expose additional deposits and create more surface area which is more readily attacked by the chemical solution. When the two chelating agents are used synergistically, calcium cations form a complex with both tetrasodium ethylenediaminetetraacetate (EDTA, NaEDTA) and 1-hydroxyl ethylidene-1,1,-diphosphonic acid (HEDP). With a sufficient quantity of both chelating agents present in the compound, the chelating agents complex the re-dissolved calcium cation.

The hydroxide bases include all organic and inorganic hydroxide bases that have phase transfer functionality, allowing the carbonate or bicarbonate converter chemistry created during the in-situ reaction greater penetrating power into scales that have been coated and/or interspersed with common organic deposits, such as paraffins and asphaltenes. In one embodiment, the hydroxide base can be tetramethylammonium hydroxide. Other organic or inorganic hydroxide bases that achieve similar effects include sodium hydroxides, manganese(II) hydroxide, barium hydroxide octahydrate, aluminum hydroxide, calcium hydroxide, iron (III) hydroxide, barium hydroxide, magnesium hydroxide, ammonium hydroxide, potassium hydroxide, chromium(III) hydroxide, tin(IV) hydroxide, chromium(II) hydroxide, silver hydroxide, lead(IV) hydroxide, platinum(IV) hydroxide, zinc hydroxide, copper(II) hydroxide, beryllium hydroxide, vanadium(V) hydroxide, iron(II) hydroxide, manganese(IV) hydroxide, lead(II) hydroxide, strontium hydroxide, tin(II) hydroxide, vanadium(III) hydroxide, lithium hydroxide, mercury(II) hydroxide, nickel(II) hydroxide, mercury(I) hydroxide, copper(I) hydroxide, tetraethylammonium hydroxide, tetrabutylammonium hydroxide, and choline hydroxide. The organic or inorganic hydroxide base should be present in the composition at a level of 1-5% by weight, or 1-3% by weight.

The heat-stable, high cloud point, low foam surfactant wetting agent is an amphoteric or anionic surfactant, or an anionic surfactant from the sodium alkyl sulfonate family. In one embodiment, the surfactant wetting agent can be a sodium alkyl sulfonate with a chemical structure $RCH_2$—$SO_3Na$, where $R=C_7$. Other surfactant wetting agents and similar derivatives that achieve similar effects include anionic surfactants (carboxylates, alkyl sulfates, alkyl ether sulfates, sulfated alkanolamines, glyceride sulfates, sulfonates, sulfo-carboxylic compounds, organo-phosphored surfactants, sarcosides), nonionic surfactants (ethoxylated linear alcohols, ethoxylated alkyl phenols, fatty acid esters, amine and amide derivatives, alkylpolyglucosides, ethylene oxide/propyleneoxide copolymers, polyalcohols and ethoxylated polyalcohols, thiols and derivatives), cationic surfactants (linear alkyl-amines, alkyl-ammoniums, fatty amines, quaternary alkyl-ammoniums (quats), linear diamines, amides, ester-amines, ether-amines, oxy-amines, ethoxy-amines, alkanol-amides, amino-acids), amphoteric surfactants (amino propionic acids, imido propionic acids, quaternized compounds), silicon surfactants, fluorinated surfactants, and polymer surfactants. The low foam surfactant wetting agent should be present in the composition at a level of 1-5% by weight, or 1-3% by weight.

The dilutions of as little as 20% are highly effective, especially on metal sulfate scales 22 that are coated and/or interspersed with common organic deposits, such as paraffins and asphaltenes. By using a conversion chemistry with phase-transfer properties, and a synergistic blend of appropriate chelating agents to form converted metal sulfates to carbonates to a least stable, most soluble carbonate polymorphs, converter-dissolver composition 30 provides fast, efficient, and broad applications to removing metal sulfate scaling 22.

Converter-dissolver composition 30 is made by forming an aqueous solution comprising the polyaminocarboxylic acid and organophosphorus compound chelating agents, organic or inorganic carbonate or bicarbonate, organic or inorganic hydroxide base, and heat-stable, high cloud point, low foam sodium alkyl sulfonate surfactant wetting agent. For example, a mixture of a first chelating agent and the organic or inorganic carbonate or bicarbonate is made, and the mixture is then diluted with deionized water to the appropriate concentration and allowed to mix for five minutes. The hydroxide base is then added to the mixture to facilitate the selected organic or inorganic carbonate or bicarbonate dissolution through the reaction with the desired hydroxide. The solution pH should be about 10.0-10.5, or 10.0-10.2. The mixture is allowed to mix for an additional five minutes to ensure full dissolution of the organic or inorganic carbonate or bicarbonate and reaction with the desired hydroxide base. The desired organophosphorus compound is then added in small quantities to convert any potential organic or inorganic carbonate reaction product to the more desirable organic or inorganic bicarbonate. The pH should be adjusted with the organophosphorus compound until the final pH is between 7.5-8.0, or between 7.5-7.75. The mixture is allowed to mix for an additional five minutes to ensure a full reaction has taken place.

The following examples demonstrate processes of making converter-dissolver composition 30. Samples of calcium sulfate scale chips are prewashed with solutions of aromatic and aliphatic hydrocarbon solvents in order to remove any coated and/or interspersed common organic deposits, such as paraffins and asphaltenes, from the scale in order to get a more representative view of the pure reaction between the scale and converter-dissolver solutions. Calcium sulfate scale chips are prewashed for 24 hours, with agitation at 80° C., removed, rinsed with solutions of fresh aromatic and aliphatic hydrocarbon solvents, and then allowed to dry in an oven at 60° C. for 24 hours.

Example 1—Composition for Dissolving Calcium Sulfate

The following composition is used to form a calcium sulfate scale solution:

TABLE 1

| Compound | By Weight |
| --- | --- |
| 1-Hydroxyl ethylidene-1,1,-diphosphonic acid (HEDP) | 4.37% |
| Tetrasodium ethylenediaminetetraacetate (EDTA, NaEDTA) | 14.44% |
| Deionized water | 75.41% |
| Sodium bicarbonate | 4.00% |
| Tetramethylammonium hydroxide | 1.43% |
| Sodium alkyl sulfonate with a chemical structure $RCH_2$—$SO_3Na$, where $R = C_7$ | 0.35% |

The 1-hydroxyl ethylidene-1,1,-diphosphonic acid (HEDP) and tetrasodium ethylenediaminetetraacetate (EDTA, NaEDTA) are mixed together with the sodium bicarbonate and deionized water and allowed to react for five minutes. The tetramethylammonium hydroxide is added to the mixture to dissolve the sodium bicarbonate and form an in-situ reaction with a tetramethylammonium carbonate product until a pH of 10.0-10.5, or 10.0-10.2, and allowed to mix for an additional five minutes to ensure a complete reaction. The final solution pH is then adjusted with 1-hydroxyl ethylidene-1,1,-diphosphonic acid (HEDP) to react with the tetramethylammonium carbonate to form the more favorable embodiment, tetramethylammonium bicarbonate via in-situ reaction until a pH of 7.5-8.0, or 7.75, is achieved. The solution is allowed to mix for an additional five minutes to ensure a complete reaction and steady pH at which time the surfactant wetting agent is added and mixed for one additional minute.

A quantity of 50 milliliters (mls) of concentrated solution is heated to 80° C. and maintained between 80-85° C. for the remainder of the treatment. A sample of 6.0 grams of calcium sulfate scale chips measuring 2.0 mm thick is added to the solution and allowed to react. The calcium sulfate scale fully dissolves in 12 minutes and 11 seconds. During dissolution, any remaining interspersed common organic deposits, such as paraffins and asphaltenes, separated from the calcium sulfate scale and floated to the top of the test solution confirming the agglomerated, interspersed nature of the calcium sulfate scale and common organic deposits.

Example 2—Composition for Dissolving Calcium Sulfate

The following composition is used to form a calcium sulfate scale solution:

TABLE 2

| Compound | By Weight |
| --- | --- |
| 1-Hydroxyl ethylidene-1,1,-diphosphonic acid (HEDP) | 4.37% |
| Tetrasodium ethylenediaminetetraacetate (EDTA, NaEDTA) | 14.44% |
| Deionized water | 75.97% |
| Sodium bicarbonate | 4.00% |
| Ammonium hydroxide | 0.87% |
| Sodium alkyl sulfonate with a chemical structure $RCH_2$—$SO_3Na$, where $R = C_7$ | 0.35% |

The 1-hydroxyl ethylidene-1,1,-diphosphonic acid (HEDP) and tetrasodium ethylenediaminetetraacetate (EDTA, NaEDTA) are mixed together with the sodium bicarbonate and deionized water and allowed to react for five minutes. The ammonium hydroxide is added to the mixture to dissolve the sodium bicarbonate and form an in-situ reaction with an ammonium carbonate product until a pH of 10.0-10.5, or 10.0-10.2, and allowed to mix for an additional five minutes to ensure a complete reaction. The final solution pH is then adjusted with 1-hydroxyl ethylidene-1,1,-diphosphonic acid (HEDP) to react with the ammonium carbonate to form the more favorable embodiment, ammonium bicarbonate via in-situ reaction until a pH of 7.5-8.0, or 7.75, is achieved. The solution is allowed to mix for an additional five minutes to ensure a complete reaction and steady pH, at which time the surfactant wetting agent is added and mixed for one additional minute.

A quantity of 50 mls of concentrated solution is heated to 80° C. and maintained between 80-85° C. for the remainder of the treatment. A sample of 6.0 grams of calcium sulfate scale chips measuring 2.0 mm thick is added to the solution and allowed to react. The calcium sulfate scale fully dissolves in 14 minutes and 28 seconds. The substitution of the ammonium hydroxide for the tetramethylammonium hydroxide shows a considerable loss in reaction speed. During dissolution, any remaining interspersed common organic deposits, such as paraffins and asphaltenes, separated from the calcium sulfate scale and floated to the top of the test solution confirming the agglomerated, interspersed nature of the calcium sulfate scale and common organic deposits.

Example 3—Composition for Dissolving Calcium Sulfate

The following composition is used to form a calcium sulfate scale solution:

TABLE 3

| Compound | By Weight |
| --- | --- |
| 1-Hydroxyl ethylidene-1,1,-diphosphonic acid (HEDP) | 4.37% |
| Tetrasodium ethylenediaminetetraacetate (EDTA, NaEDTA) | 14.44% |
| Deionized water | 75.76% |
| Sodium bicarbonate | 4.00% |
| Tetramethylammonium hydroxide | 1.43% |

The 1-hydroxyl ethylidene-1,1,-diphosphonic acid (HEDP) and tetrasodium ethylenediaminetetraacetate (EDTA, NaEDTA) are mixed together with the sodium bicarbonate and deionized water and allowed to react for five minutes. The tetramethylammonium hydroxide is added to the mixture to dissolve the sodium bicarbonate and form an in-situ reaction with a tetramethylammonium carbonate product until a pH of 10.0-10.5, or 10.0-10.2, and allowed to mix for an additional five minutes to ensure a complete reaction. The final solution pH is then adjusted with 1-hydroxyl ethylidene-1,1,-diphosphonic acid (HEDP) to react with the tetramethylammonium carbonate to form the more favorable embodiment, tetramethylammonium bicarbonate via in-situ reaction until a pH of 7.5-8.0, or 7.75, is achieved. The solution is allowed to mix for an additional five minutes to ensure a complete reaction and steady pH. The surfactant wetting agent is omitted from this embodiment.

A quantity of 50 mls of concentrated solution is heated to 80° C. and maintained between 80-85° C. for the remainder of the treatment. A sample of 6.0 grams of calcium sulfate scale chips measuring 2.0 mm thick is added to the solution and allowed to react. The calcium sulfate scale fully dissolves in 14 minutes and 30 seconds. During dissolution, any remaining interspersed common organic deposits, such as paraffins and asphaltenes, separated from the calcium sulfate scale and floated to the top of the test solution confirming the agglomerated, interspersed nature of the calcium sulfate scale and common organic deposits.

Example 4—Composition for Dissolving Calcium Sulfate

The following composition is used to form a calcium sulfate scale solution:

TABLE 4

| Compound | By Weight |
| --- | --- |
| 1-Hydroxyl ethylidene-1,1,-diphosphonic acid (HEDP) | 4.37% |
| Tetrasodium ethylenediaminetetraacetate (EDTA, NaEDTA) | 14.44% |
| Deionized water | 76.32% |
| Sodium bicarbonate | 4.00% |
| Ammonium hydroxide | 0.87% |

The 1-hydroxyl ethylidene-1,1,-diphosphonic acid (HEDP) and tetrasodium ethylenediaminetetraacetate (EDTA, NaEDTA) are mixed together with the sodium bicarbonate and deionized water and allowed to react for five minutes. The ammonium hydroxide is added to the mixture to dissolve the sodium bicarbonate and form an in-situ reaction with an ammonium carbonate product until a pH of 10.0-10.5, or 10.0-10.2, and allowed to mix for an additional five minutes to ensure a complete reaction. The final solution pH is then adjusted with 1-hydroxyl ethylidene-1,1,-diphosphonic acid (HEDP) to react with the ammonium carbonate to form the more favorable embodiment, ammonium bicarbonate via in-situ reaction until a pH of 7.5-8.0, or 7.75, is achieved. The solution is allowed to mix for an additional five minutes to ensure a complete reaction and steady pH. The surfactant wetting agent is omitted from this embodiment.

A quantity of 50 mls of concentrated solution is heated to 80° C. and maintained between 80-85° C. for the remainder of the treatment. A sample of 6.0 grams of calcium sulfate scale chips measuring 2.0 mm thick is added to the solution and allowed to react. The calcium sulfate scale fully dissolves in 17 minutes and 8 seconds. Omission of the surfactant wetting agent shows a loss in reaction speed, in addition to the loss due to the substitution of the ammonium hydroxide for the tetramethylammonium hydroxide. During dissolution, any remaining interspersed common organic deposits, such as paraffins and asphaltenes, separated from the calcium sulfate scale and floated to the top of the test solution confirming the agglomerated, interspersed nature of the calcium sulfate scale and common organic deposits.

Example 5—Composition for Dissolving Calcium Sulfate

The following composition is used to form a calcium sulfate scale solution:

TABLE 5

| Compound | By Weight |
| --- | --- |
| 1-Hydroxyl ethylidene-1,1,-diphosphonic acid (HEDP) | 4.37% |
| Glutamic acid, N,N-diacetic acid, tetrasodium (GLDA Na4) | 14.44% |
| Deionized water | 75.41% |
| Sodium bicarbonate | 4.00% |
| Tetramethylammonium hydroxide | 1.43% |
| Sodium alkyl sulfonate with a chemical structure $RCH_2$—$SO_3Na$, where R = $C_7$ | 0.35% |

The 1-hydroxyl ethylidene-1,1,-diphosphonic acid (HEDP) and Glutamic acid, N,N-diacetic acid, tetrasodium (GLDA Na4) are mixed together with the sodium bicarbonate and deionized water and allowed to react for five minutes. The tetramethylammonium hydroxide is added to the mixture to dissolve the sodium bicarbonate and form an in-situ reaction with a tetramethylammonium carbonate product until a pH of 10.0-10.5, or 10.0-10.2, and allowed to mix for an additional five minutes to ensure a complete reaction. The final solution pH is then adjusted with 1-hydroxyl ethylidene-1,1,-diphosphonic acid (HEDP) to react with the tetramethylammonium carbonate to form the more favorable embodiment, tetramethylammonium bicarbonate via in-situ reaction until a pH of 7.5-8.0, or 7.75, is achieved. The solution is allowed to mix for an additional five minutes to ensure a complete reaction and steady pH at which time the surfactant wetting agent is added and mixed for one additional minute.

A quantity of 50 mls of concentrated solution is heated to 80° C. and maintained between 80-85° C. for the remainder of the treatment. A sample of 6.0 grams of calcium sulfate scale chips measuring 2.0 mm thick is added to the solution and allowed to react. The calcium sulfate scale fully dissolves in 27 minutes and 20 seconds. The substitution of the Glutamic acid, N,N-diacetic acid, tetrasodium (GLDA Na4) for the tetrasodium ethylenediaminetetraacetate (EDTA, NaEDTA) showed considerable losses in reaction speed. During dissolution, any remaining interspersed common organic deposits, such as paraffins and asphaltenes, separated from the calcium sulfate scale and floated to the top of the test solution confirming the agglomerated, interspersed nature of the calcium sulfate scale and common organic deposits.

Example 6—Composition for Dissolving Calcium Sulfate

The following composition is used to form a calcium sulfate scale solution:

TABLE 6

| Compound | By Weight |
| --- | --- |
| 1-Hydroxyl ethylidene-1,1,-diphosphonic acid (HEDP) | 4.37% |
| Pentapotassium diethylenetriaminepentaacetate (K5DPTA, DPTA) | 14.44% |

TABLE 6-continued

| Compound | By Weight |
| --- | --- |
| Deionized water | 75.41% |
| Sodium bicarbonate | 4.00% |
| Tetramethylammonium hydroxide | 1.43% |
| Sodium alkyl sulfonate with a chemical structure $RCH_2$—$SO_3Na$, where $R = C_7$ | 0.35% |

The 1-hydroxyl ethylidene-1,1,-diphosphonic acid (HEDP) and Pentapotassium diethylenetriaminepentaacetate (KSDPTA, DPTA) are mixed together with the sodium bicarbonate and deionized water and allowed to react for five minutes. The tetramethylammonium hydroxide is added to the mixture to dissolve the sodium bicarbonate and form an in-situ reaction with a tetramethylammonium carbonate product until a pH of 10.0-10.5, or 10.0-10.2, and allowed to mix for an additional five minutes to ensure a complete reaction. The final solution pH is then adjusted with 1-hydroxyl ethylidene-1,1,-diphosphonic acid (HEDP) to react with the tetramethylammonium carbonate to form the more favorable embodiment, tetramethylammonium bicarbonate via in-situ reaction until a pH of 7.5-8.0, or 7.75, is achieved. The solution is allowed to mix for an additional five minutes to ensure a complete reaction and steady pH at which time the surfactant wetting agent is added and mixed for one additional minute.

A quantity of 50 mls of concentrated solution is heated to 80° C. and maintained between 80-85° C. for the remainder of the treatment. A sample of 6.0 grams of calcium sulfate scale chips measuring 2.0 mm thick is added to the solution and allowed to react. The calcium sulfate scale fully dissolves in 27 minutes and 58 seconds. During dissolution, any remaining interspersed common organic deposits, such as paraffins and asphaltenes, separated from the calcium sulfate scale and floated to the top of the test solution confirming the agglomerated, interspersed nature of the calcium sulfate scale and common organic deposits.

Example 7—Composition for Dissolving Calcium Sulfate

The following composition is used to form a calcium sulfate scale solution:

TABLE 7

| Compound | By Weight |
| --- | --- |
| Glutamic acid, N,N-diacetic acid, tetrasodium (GLDA Na4) | 38.00% |
| Deionized water | 62.00% |

A quantity of 50 mls of the concentrated solution of Glutamic acid, N,N-diacetic acid, tetrasodium (GLDA Na4), pH=11.5, is heated to 80° C. and maintained between 80-85° C. for the remainder of the treatment. A sample of 6.0 grams of calcium sulfate scale chips measuring 2.0 mm thick is added to the solution and allowed to react. The calcium sulfate scale fully dissolves in 45 minutes 12 seconds. A single polyaminocarboxylic acid chelating agent, Glutamic acid, N,N-diacetic acid, tetrasodium (GLDA Na4), is much less effective against calcium sulfate scale than the invention, and the use of a converter and synergistic addition of an organophosphorus chelating agent accelerates the overall reaction.

Figure 3:
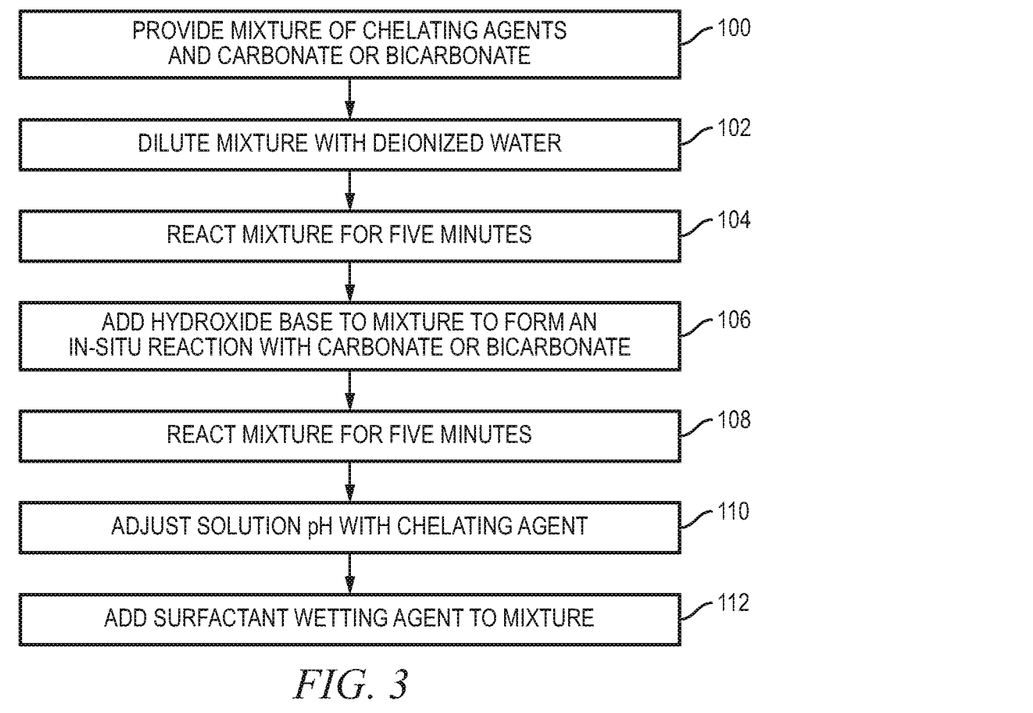
FIG. 3 illustrates a process of making the converter-dissolver composition.

FIG. 3 shows a process of making converter-dissolver composition 30 in an aqueous solution. In step 100, a mixture of chelating agents and carbonate or bicarbonate is provided. In step 102, the mixture is diluted with deionized water. In step 104, the mixture reacts for five minutes. In step 106, the hydroxide base is added to the mixture to form an in-situ reaction with carbonate or bicarbonate. In step 108, the mixtures react for five minutes. In step 110, the solution pH is adjusted with at least one of the chelating agents. In step 112, the surfactant wetting agent is added to the mixture.

To use converter-dissolver composition 30, the composition must be heated to a minimum of 70° C. and a maximum of 100° C. when used in a standard pressure environment (one atmosphere). When used in downhole environments, where greater pressures exist, operating temperatures of the composition can be heated to 230° C. and still remain effective. The approximate effective ratio of metal sulfate scale needing to be dissolved to the volume of composition needed for dissolution is 1:1. A quantity of 3.78 liters of composition concentrate fully dissolves 0.45 kilograms of metal sulfate scales 22. When using the composition at 100% concentration, at the proper operating temperature described above, samples of scale dissolve in 0.25-1.5 hours. Converter-dissolver composition 30 may be circulated to enhance the reaction. In downhole environments where scales that are often coated and/or interspersed with common organic deposits, such as paraffins and asphaltenes, the composition removes comingled organic/scale deposits by partially dissolving the scale while subsequently loosening the agglomeration to a point where it can be flushed away, leaving a clean surface.

Converter-dissolver composition 30 is particularly useful at removing metal sulfate scales 22 from oil or gas well and pipeline equipment, such as interior surface 24 of piping 16. It is particularly useful in removing calcium sulfate and barium sulfate from producing wells, injection or disposal wells, heater treaters, boilers, coil-tubing, flow lines, tubing, formation surfaces, in water flooding, and the like.

Figure 4:
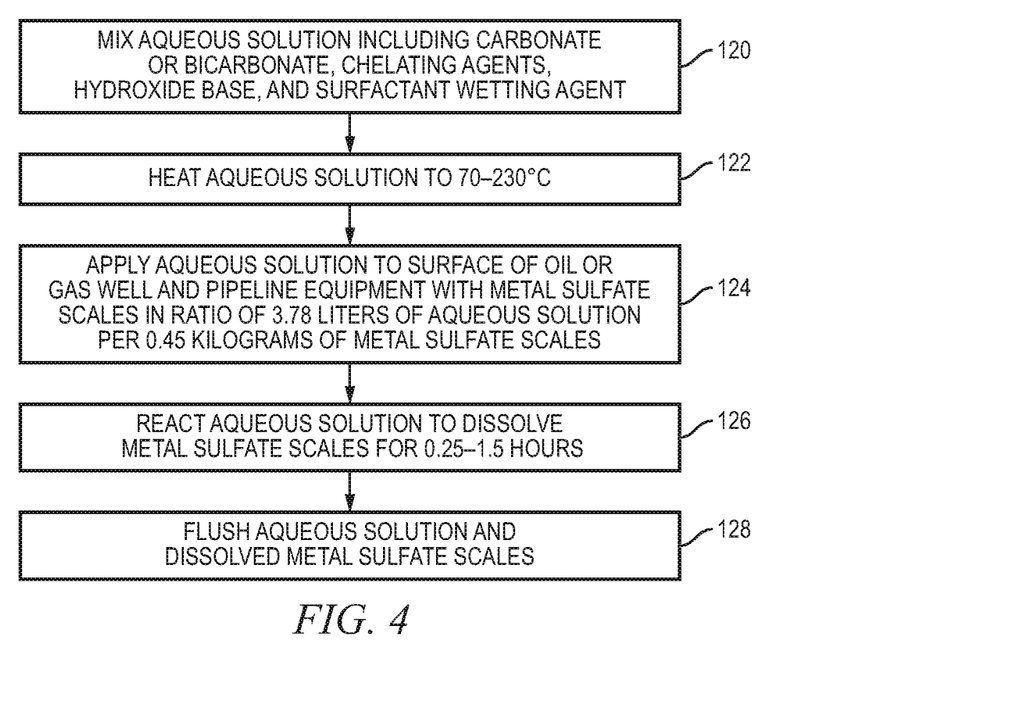
FIG. 4 illustrates a process of using the converter-dissolver composition.

FIG. 4 shows a process of using converter-dissolver composition 30 in an aqueous solution to remove metal sulfate scales 22 from oil or gas well and pipeline equipment. In step 120, an aqueous solution including a carbonate or bicarbonate, plurality of chelating agents, hydroxide base, and surfactant wetting agent is mixed. In step 122, the aqueous solution is heated to 70-230° C. In step 124, the aqueous solution is applied to a surface of oil and gas well and pipeline equipment with metal sulfate scales in ratio of 3.78 liters of aqueous solution per 0.45 kilograms of metal sulfate scales. In step 126, the aqueous solution reacts to dissolve metal sulfate scales for 0.25-1.5 hours. In step 128, the aqueous solution and dissolved metal sulfate scales is flushed.

In summary, converter-dissolver composition 30 is formed by adding an organic or inorganic hydroxide base to an aqueous solution of a synergistic blend of chelating agents, along with a soluble organic or inorganic carbonates or bicarbonates, and finally adding an appropriate surfactant wetting agent to the blend. The organic or inorganic carbonate or bicarbonate can be sodium bicarbonate. The selected synergistic blend of chelating agents comprises an organophosphorus compound, polyaminocarboxylic acid, and mixtures thereof. The organophosphorus compound is 1-hydroxyl ethylidene-1,1,-diphosphonic acid (HEDP) and the polyaminocarboxylic acid is tetrasodium ethylenediaminetetraacetate (EDTA, NaEDTA). The organic or inorganic base is selected from hydroxide compounds, e.g., tetramethylammonium hydroxide. The surfactant wetting agent is selected from a class of anionic, amphoteric, nonionic, fluoro, silicon or polymer surfactants, or from the anionic sodium alkyl sulfonate family with a chemical structure RCH$_2$—SO$_3$Na, where R═C$_7$. Converter-dissolver composition 30 is heated to 70-230° C. and then circulated over scale deposits.

Converter-dissolver composition 30 dissolves metal sulfate scales 22, particularly barium sulfate, calcium sulfate and strontium sulfate, from surfaces including oil or gas well and pipeline equipment. A converter solution of aqueous organic or inorganic carbonates or bicarbonates converts the insoluble metals sulfates into acid soluble metal carbonates. A synergistic mixture of chelating agents influences the crystalline polymorphic forms of converted metal sulfates to carbonates to their least stable, most soluble polymorphs. The same synergistic mixture of chelating agents sequesters aqueous metal cations released in the acidification of the metals carbonates. An organic or inorganic hydroxide base forms an in-situ reaction with the selected aqueous organic or inorganic carbonate or bicarbonate, giving the converter greater phase-transfer characteristics. A heat-stable, high cloud point, low foam surfactant wetting agent is provided.

The composition proves effective when fully concentrated or diluted to 20% with water. Due to the combined organic and inorganic mixture of components, the composition is also particularly effective at removing calcium and barium sulfate scale deposits that are coated and/or interspersed with common organic deposits, such as paraffins and asphaltenes, commonly found in oil or gas well and pipeline equipment. With a near neutral pH of 7.5-8.0, the composition is a safe, fast, non-corrosive mixture for removing sulfate metal scales.

While one or more embodiments of the present invention have been illustrated in detail, the skilled artisan will appreciate that modifications and adaptations to those embodiments may be made without departing from the scope of the present invention as set forth in the following claims.

What is claimed:

1. A converter-dissolver composition in aqueous solution for dissolving metal sulfate scales, comprising:
    a bicarbonate with a phase transfer property for penetration into the metal sulfate scales, the bicarbonate being selected from the group consisting of choline bicarbonate, tetramethylammonium bicarbonate, tetraethylammonium bicarbonate, and tetrabutylammonium bicarbonate;
    a plurality of chelating agents including a first chelating agent that comprises ethylenediaminetetraacetate (EDTA) and a second chelating agent that comprises 1-hydroxyethylidene-1,1-diphosphonic acid (HEDP), wherein the plurality of chelating agents is selected to influence the crystalline polymorph of the metal sulfate scales;
    a hydroxide base selected from the group consisting of tetramethylammonium hydroxide, tetraethylammonium hydroxide, tetrabutylammonium hydroxide, and choline hydroxide; and
    a surfactant wetting agent comprising sodium alkyl sulfonate with a chemical structure RCh2-S03Na, with R═C7, wherein the metal sulfate scales dissolves in less than 12 minutes and 11 seconds.

2. The converter-dissolver composition of claim 1, wherein the first chelating agent of the plurality of chelating agents is selected from a group consisting of tetrasodium ethylenediaminetetraacetate (EDTA, NaEDTA), diammonium ethylenediaminetetraacetate ((NH4)2EDTA), tetraammonium ethylenediaminetetraacetate ((NH4)4EDTA), tetrasodium ethylenediaminetetraacetate tetrahydrate (NaEDTA*4H2O), disodium ethylenediaminetetraacetate dehydrate (Na2H2EDTA*2H2O), ethylene diaminetetraacetic acid (H4EDTA), disodium ethylenediaminetetraacetate dehydrate (Na2H2EDTA*2H2O), calcium disodium ethylenediaminetetraacetate dehydrate (CaNa2H2EDTA*2H2O), and glucoheptanoic aciddium N-(hydroxyethyl)-ethylenediaminetriacetate (HEDTA).

3. The converter-dissolver composition of claim 2, wherein the second chelating agent of the plurality of chelating agents is 1-hydroxyl ethylidene-1,1,-diphosphonic acid (HEDP).

4. A converter-dissolver composition, comprising:
    an aqueous solution including a bicarbonate with a phase transfer property for penetration into the metal sulfate scales, the bicarbonate being selected from the group consisting of choline bicarbonate, tetramethylammonium bicarbonate, tetraethylammonium bicarbonate, and tetrabutylammonium bicarbonate;
    a plurality of chelating agents selected suitable to influence the crystalline polymorph of the metal sulfate scales including a first chelating agent that comprises ethylenediaminetetraacetate (EDTA) and a second chelating agent that comprises 1-hydroxyethylidene-1,1-diphosphonic acid (HEDP);
    a hydroxide base selected from the group consisting of tetramethylammonium hydroxide, tetraethylammonium hydroxide, tetrabutylammonium hydroxide, and choline hydroxide; and
    a surfactant wetting agent comprising sodium alkyl sulfonate with a chemical structure RCh2-S03Na, with R═C7, wherein the metal sulfate scales dissolves in less than 12 minutes and 11 seconds.

5. A converter-dissolver composition for dissolving metal sulfate scales, comprising:
    an aqueous solution including a bicarbonate selected from the group consisting of choline bicarbonate, tetramethylammonium bicarbonate, tetraethylammonium bicarbonate, and tetrabutylammonium bicarbonate;
    a plurality of chelating agents including a first chelating agent that comprises ethylenediaminetetraacetate (EDTA) and a second chelating agent that comprises 1-hydroxyethylidene-1,1-diphosphonic acid (HEDP);
    a hydroxide base selected from the group consisting of tetramethylammonium hydroxide, tetraethylammonium hydroxide, tetrabutylammonium hydroxide, and choline hydroxide; and
    a surfactant wetting agent comprising sodium alkyl sulfonate with a chemical structure RCh2-S03Na, with R═C7, wherein the metal sulfate scales dissolves in less than 12 minutes and 11 seconds.

6. The converter-dissolver composition of claim 4, wherein the first chelating agent of the plurality of chelating agents is selected from a group consisting of tetrasodium ethylenediaminetetraacetate (EDTA, NaEDTA), diammonium ethylenediaminetetraacetate ((NH4)2EDTA), tetraammonium ethylenediaminetetraacetate ((NH4)4EDTA), tetrasodium ethylenediaminetetraacetate tetrahydrate (NaEDTA*4H2O), disodium ethylenediaminetetraacetate dehydrate (Na2H2EDTA*2H2O), ethylene diaminetetraacetic acid (H4EDTA), disodium ethylenediaminetetraacetate dehydrate (Na2H2EDTA*2H2O), calcium disodium ethylenediaminetetraacetate dehydrate (CaNa2H2EDTA*2H2O), and trisodium N-(hydroxyethyl)-ethylenediaminetriacetate (HEDTA).

7. The converter-dissolver composition of claim 4, wherein the second chelating agent of the plurality of chelating agents is 1-hydroxyl ethylidene-1,1,-diphosphonic acid (HEDP).

8. The converter-dissolver composition of claim 5, wherein the first chelating agent of the plurality of chelating agents is selected from a group consisting of tetrasodium ethylenediaminetetraacetate (EDTA, NaEDTA), diammonium ethylenediaminetetraacetate ((NH4)2EDTA), tetraammonium ethylenediaminetetraacetate ((NH4)4EDTA), tetrasodium ethylenediaminetetraacetate tetrahydrate (NaEDTA*4H2O), disodium ethylenediaminetetraacetate dehydrate (Na2H2EDTA*2H2O), ethylene diaminetetraacetic acid (H4EDTA), disodium ethylenediaminetetraacetate dehydrate (Na2H2EDTA*2H2O), calcium disodium ethylenediaminetetraacetate dehydrate (CaNa2H2EDTA*2H2O), and trisodium N-(hydroxyethyl)-ethylenediaminetriacetate (HEDTA).

9. The converter-dissolver composition of claim 5, wherein the second chelating agent of the plurality of chelating agents is 1-hydroxyl ethylidene-1,1,-diphosphonic acid (HEDP).

10. The converter-dissolver composition of claim 1, wherein the first chelating agent further comprises an polyaminocarboxylic acid, pentasodium diethylenetriamine-pentaacetate (Na5DPTA, DPTA), pentapotassium diethylenetriaminepentaacetate (K5DPTA, DPTA), diethylenetriaminepentaacetic acid (H5DPTA, DPTA), nitriloacetic acid, trisodium salt (NTA), N,N-diacetic acid, tetrasodium (GLDA Na4), glutamic acid, N,N-diacetic acid, monosodium (GLDA Na), ethanoldiglycinic acid (EDG Na2, HEIDA), or glucoheptanoic acid.

11. The converter-dissolver composition of claim 1, wherein the second chelating agent further comprises an organophosphonic acid, amino tri (methylene phosphonic acid) (AMTP), diethylenetriamine penta(methylene phosphonic acid), bis(hexamethylene triamine penta(methylene-phosphonic acid)), ethylidenediamine tris(methylene phosphonic acid), pentapotassium salt Na5EDTMP, hexamethylenediamine tetra(methylene phosphonic acid), potassium salt, or hydroxyacetic acid (glycolic acid).

12. The converter-dissolver composition of claim 4, wherein the first chelating agent further comprises a polyaminocarboxylic acid, pentasodium diethylenetriamine-pentaacetate (Na5DPTA, DPTA), pentapotassium diethylenetriaminepentaacetate (K5DPTA, DPTA), diethylenetriaminepentaacetic acid (H5DPTA, DPTA), nitriloacetic acid, trisodium salt (NTA), N,N-diacetic acid, tetrasodium (GLDA Na4), glutamic acid, N,N-diacetic acid, monosodium (GLDA Na), ethanoldiglycinic acid (EDG Na2, HEIDA), or glucoheptanoic acid.

13. The converter-dissolver composition of claim 4, wherein the second chelating agent further comprises an organophosphonic acid, amino tri (methylene phosphonic acid) (AMTP), diethylenetriamine penta(methylene phosphonic acid), bis(hexamethylene triamine penta(methylene-phosphonic acid)), ethylidenediamine tris(methylene phosphonic acid), pentapotassium salt Na5EDTMP, hexamethylenediamine tetra(methylene phosphonic acid), potassium salt, or hydroxyacetic acid (glycolic acid).

14. The converter-dissolver composition of claim 5, wherein the first chelating agent further comprises a polyaminocarboxylic acid, pentasodium diethylenetriamine-pentaacetate (Na5DPTA, DPTA), pentapotassium diethylenetriaminepentaacetate (K5DPTA, DPTA), diethylenetriaminepentaacetic acid (H5DPTA, DPTA), nitriloacetic acid, trisodium salt (NTA), N,N-diacetic acid, tetrasodium (GLDA Na4), glutamic acid, N,N-diacetic acid, monosodium (GLDA Na), ethanoldiglycinic acid (EDG Na2, HEIDA), or glucoheptanoic acid.

15. The converter-dissolver composition of claim 5, wherein the second chelating agent further comprises an organophosphonic acid, amino tri (methylene phosphonic acid) (AMTP), diethylenetriamine penta(methylene phosphonic acid), bis(hexamethylene triamine penta(methylene-phosphonic acid)), ethylidenediamine tris(methylene phosphonic acid), pentapotassium salt Na5EDTMP, hexamethylenediamine tetra(methylene phosphonic acid), potassium salt, or hydroxyacetic acid (glycolic acid).

* * * * *